(12) United States Patent
Olsson et al.

(10) Patent No.: US 6,958,767 B2
(45) Date of Patent: Oct. 25, 2005

(54) VIDEO PIPE INSPECTION SYSTEM EMPLOYING NON-ROTATING CABLE STORAGE DRUM

(75) Inventors: Mark S. Olsson, La Jolla, CA (US); Michael E. Turgeon, San Diego, CA (US); Jeffrey A. Prsha, San Diego, CA (US)

(73) Assignee: Deepsea Power & Light Company, San Diego, CA (US)

( * ) Notice: Subject to any disclaimer, the term of this patent is extended or adjusted under 35 U.S.C. 154(b) by 597 days.

(21) Appl. No.: 10/061,887

(22) Filed: Jan. 31, 2002

(65) Prior Publication Data

US 2003/0142207 A1     Jul. 31, 2003

(51) Int. Cl.[7] .............................................. H04N 7/18
(52) U.S. Cl. ............................. 348/82; 348/84; 348/85
(58) Field of Search ........... 348/85, 84; 254/134.3 FT, 254/382; 242/360, 397.1, 405.2, 405.3

(56) References Cited

U.S. PATENT DOCUMENTS

| 4,107,738 | A | * | 8/1978 | Van Norman ................ 348/84 |
| 4,607,925 | A | * | 8/1986 | Kamigaichi et al. .......... 396/19 |
| 5,090,259 | A | * | 2/1992 | Shishido et al. ........... 73/866.5 |
| 5,457,288 | A | * | 10/1995 | Olsson ................... 174/117 R |
| 5,604,532 | A | * | 2/1997 | Tillmanns .................... 348/84 |
| 5,754,220 | A | * | 5/1998 | Smalser, Sr. ................. 348/84 |
| 5,939,679 | A | | 8/1999 | Olsson .................... 174/113 C |
| 5,992,787 | A | * | 11/1999 | Burke ...................... 242/388.1 |
| 6,164,582 | A | * | 12/2000 | Vara ............................ 242/395 |
| 6,170,775 | B1 | * | 1/2001 | Kovacik et al. ............. 242/404 |
| 6,545,704 | B1 | * | 4/2003 | Olsson et al. ................. 348/84 |
| 6,580,449 | B1 | * | 6/2003 | Meltzer ........................ 348/85 |
| 6,632,216 | B2 | * | 10/2003 | Houzego et al. ......... 604/890.1 |

OTHER PUBLICATIONS

Exhibit 1—Photograph of Spartan Cable Caddy sold in 1986.
Spartan Model 502.220 volt Cable Machine (26 page Owners Manual) Dated Feb. 9, 2000.

* cited by examiner

*Primary Examiner*—Andy Rao
(74) *Attorney, Agent, or Firm*—Michael H. Jester

(57) ABSTRACT

A resilient, flexible video push cable is coiled in a stack of coils inside an annular portion of a non-rotating cable storage drum. A video camera head is electro-mechanically connected to a distal end of the push cable. A display is connected to a system interconnect cable which is in turn connected to a proximal end of the push cable. While the drum is held stationary, the push cable can be unwound from its main annular portion and the camera head pushed down a length of pipe. This unwinding of the push cable is facilitated by routing it through a centrally located frusto-conical guide portion of the drum. The video camera head can be pulled out of the pipe, and the push cable can be manually re-inserted through the guide portion to facilitate re-forming of the stack of coils within the main annular portion of the drum.

51 Claims, 5 Drawing Sheets

VIDEO PIPE INSPECTION SYSTEM EMPLOYING NON-ROTATING CABLE STORAGE DRUM

FIELD OF THE INVENTION

The present invention relates to electromechanical systems for inspecting the insides of pipes and other conduits for defects and obstructions.

BACKGROUND OF THE INVENTION

There are many situations where it is desirable to internally inspect long lengths of pipe which are already in place, either underground, in a building, or underwater. For example, sewer and drain pipes frequently need to be internally inspected to diagnose existing problems or determine if there are any breaks causing leakage or obstructions impairing the free flow of waste. It is also important to internally inspect steam pipes, heat exchanger pipes, water pipes, gas pipes, electrical conduits and fiber optic conduits for similar reasons. Frequently, pipes which are to be internally inspected have an internal diameter of six inches or less. It is sometimes necessary to inspect several hundred feet of pipe.

Over the years, video pipe inspection systems have been developed which typically include a camera which is forced down the pipe so that its interior can be viewed on a video display. It is common to record the inspection on a video recorder (VCR). Conventional video pipe inspection systems include a video push cable which provides an electromechanical connection between a rugged camera head enclosing and protecting the video camera and a rotatable push reel which is used to pay out cable and force the camera head down the pipe. The video push cable must be specially constructed in order to be flexible enough to make tight turns yet rigid enough to be pushed hundreds of feet down small diameter pipe. The video push cable must also incorporate electrically conductive cable having the proper impedance for conveying the NTSC or other video signals to the video display unit and additional power and ground conductors. Examples of video push cables are disclosed in U.S. Pat. No. 5,457,288 granted Oct. 10, 1995 to Mark S. Olsson and U.S. Pat. No. 5,808,239 granted Sep. 15, 1998 to Mark S. Olsson.

A conventional video pipe inspection system includes a reel around which the video push cable is wound for storage. The reel is supported on a frame for rotation about a horizontal axis for paying out the video push cable and for rewinding the video push cable about the reel. This typically requires the incorporation of a slip ring assembly into the hub and/or axle of the reel so that electrical connections can be made between the proximal end of the video push cable and circuits that provide power to the video camera head and receive video signals therefrom. The slip ring assembly is expensive and prone to failures. The frame and axle that rotatably support the reel also represent added bulk and expense.

The design of the video camera head and the manner in which it is connected to the distal end of the video push cable is critical to the performance and reliability of a video pipe inspection system. These structures must be rugged, yet the camera head must be compact and its manner of connection to the video push cable must be flexible enough to bend through tight turns. It is also desirable to incorporate an electromagnetic radiation transmitter near the video camera head so that its position can be confirmed with a remote above-ground locator instrument. Heretofore the signals radiated from such transmitters have been inherently weak, making it difficult to precisely determine the underground position of the camera head with a remote locator.

Prior commercial video pipe inspection systems have utilized a coil spring aft of the rigid video camera head to surround and protect the connection between the video push cable and the video camera head while providing the required flexibility. The turns of this coil spring have had a uniform diameter along the length thereof and this spring does not provide an optimum mechanical impedance match between the rigid video camera head and the flexible resilient push cable.

SUMMARY OF THE INVENTION

It is therefore the primary object of the present invention to provide an improved video pipe inspection system that eliminates the cost, complexity and reliability problems associated with rotating cable storage reels that utilize slip ring assemblies.

In accordance with one aspect of the present invention, a video pipe inspection system includes a video camera head and a resilient, flexible video push cable having a length sufficient for insertion a substantial distance down a pipe. The video camera head is operatively connected to a distal end of the video push cable. The video push cable is stowed in a stack of coils inside a non-rotating drum that includes a main hollow, substantially annular portion for holding the stack of coils and a hollow guide portion. The guide portion is configured to facilitate manual paying out of the video push cable from the main annular portion and manual re-insertion of the video push cable into the main annular portion and re-formation of the stack of coils.

In accordance with another aspect of the present invention, a non-rotating drum is provided for stowing a substantial length of a resilient, flexible cable in a stack of coils. The drum includes a main substantial annular portion for holding the stack of coils of the resilient, flexible cable. The drum also includes a guide portion extending from the main annular portion. The guide portion is configured to facilitate the manual paying out the cable from the main annular portion and manual re-insertion of the cable into the main annular portion and re-formation of the stack of coils.

In accordance with yet another aspect of the present invention, a method is provided for inspecting an interior of a length of pipe. The method includes an initial step of providing a resilient flexible video push cable in a stack of coils wound inside a non-rotating cable drum with a video camera head operatively connected to a distal end of the video push cable, and a video display operatively connected to a proximal end of the push cable. The next step of the method involves manually paying out the video push cable from the cable drum while the drum is stationary by uncoiling the stack of coils through a guide portion of the drum and pushing the video camera head down a length of pipe to be visually inspected. The next step involves generating and displaying a video image of the interior of the pipe based on signals from the video camera head. The final step involves manually pulling the video camera head out of the pipe, and re-inserting the cable back into the stationary drum through the guide portion to re-form the stack of coils.

The present invention also provides a novel video camera head and wet end termination assembly for use in video pipe inspection system. An elongated bladder has a forward end sealed to a video camera head. An elongated spring surrounds and encloses the bladder. A rearward coupling assembly is connected to a rearward end of the coil spring and is sealed to a rearward end of the bladder.

According to another aspect of the novel video camera head and wet end termination assembly, an elongated spring having a forward end is connected to a rearward end of a video camera head. A transmitter is mounted inside the spring and includes a transmitter coil that surrounds an elongated transmitter core. A rearward coupling assembly is connected to a rearward end of the coil spring

DESCRIPTION OF THE PREFERRED EMBODIMENT

Figure 1:
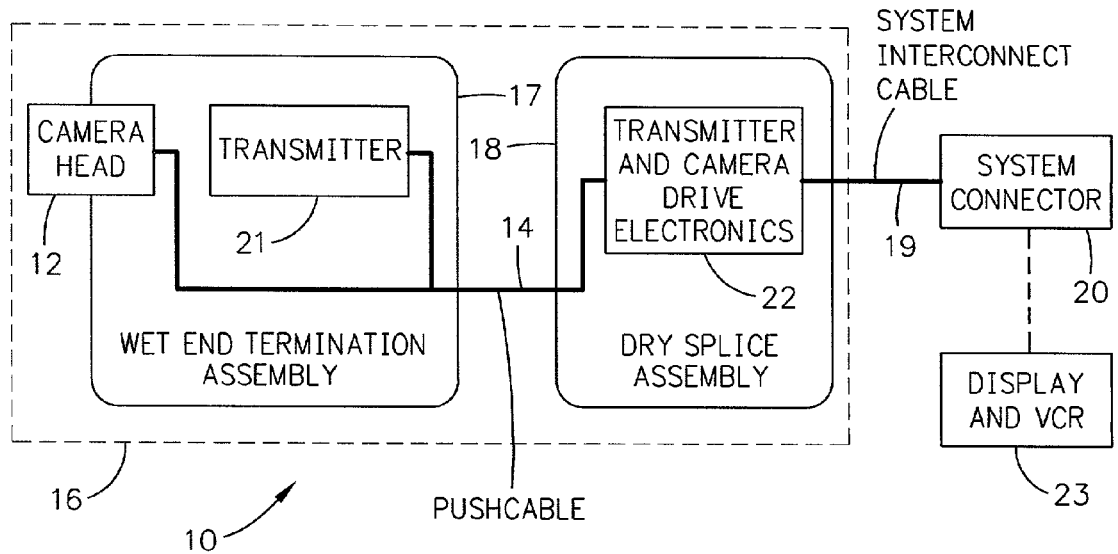
FIG. 1 is a block diagram of a video pipe inspection system in accordance with the present invention.
Figure 2:
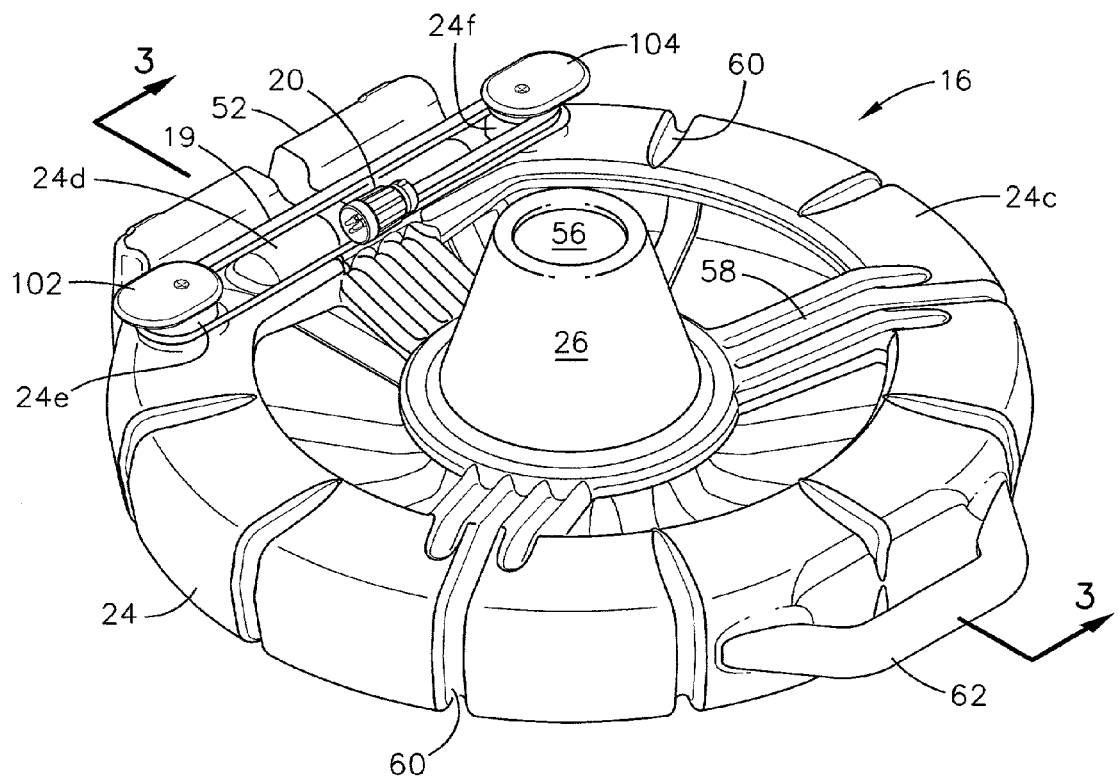
FIG. 2 is a perspective view of a non-rotating cable storage drum forming a part of the video pipe inspection system of FIG. 1.

Referring to FIG. 1, a video pipe inspection system 10 in accordance with the present invention includes a video camera head 12, a video push cable 14, and a stationary or non-rotating cable storage drum 16 (FIGS. 1 and 2). The video push cable 14 is resilient and flexible and has a length sufficient for insertion a substantial distance down a pipe to be inspected (not illustrated). The outer or distal end of the video push cable 14 is connected to the video camera head 12 via a wet end termination assembly 17 (FIG. 1). The inner or proximal end of the video push cable 14 is connected through a dry splice assembly 18 mounted inside the drum 16 to a system interconnect cable 19. The other end of the system interconnect cable 19 is connected to a system connector 20. The wet end termination assembly 17 includes a transmitter 21 for emitting locator signals at a predetermined low frequency. The dry splice assembly 18 includes transmitter and camera drive electronics 22. The video push cable 14 preferably includes a plurality of insulated wire conductors. The system interconnect cable 19 preferably includes three different insulated wire conductors. These wire conductors are connected to a video display and VCR 23 via the system connector 20 attached to the free end of the system interconnect cable 19.

Figure 3:
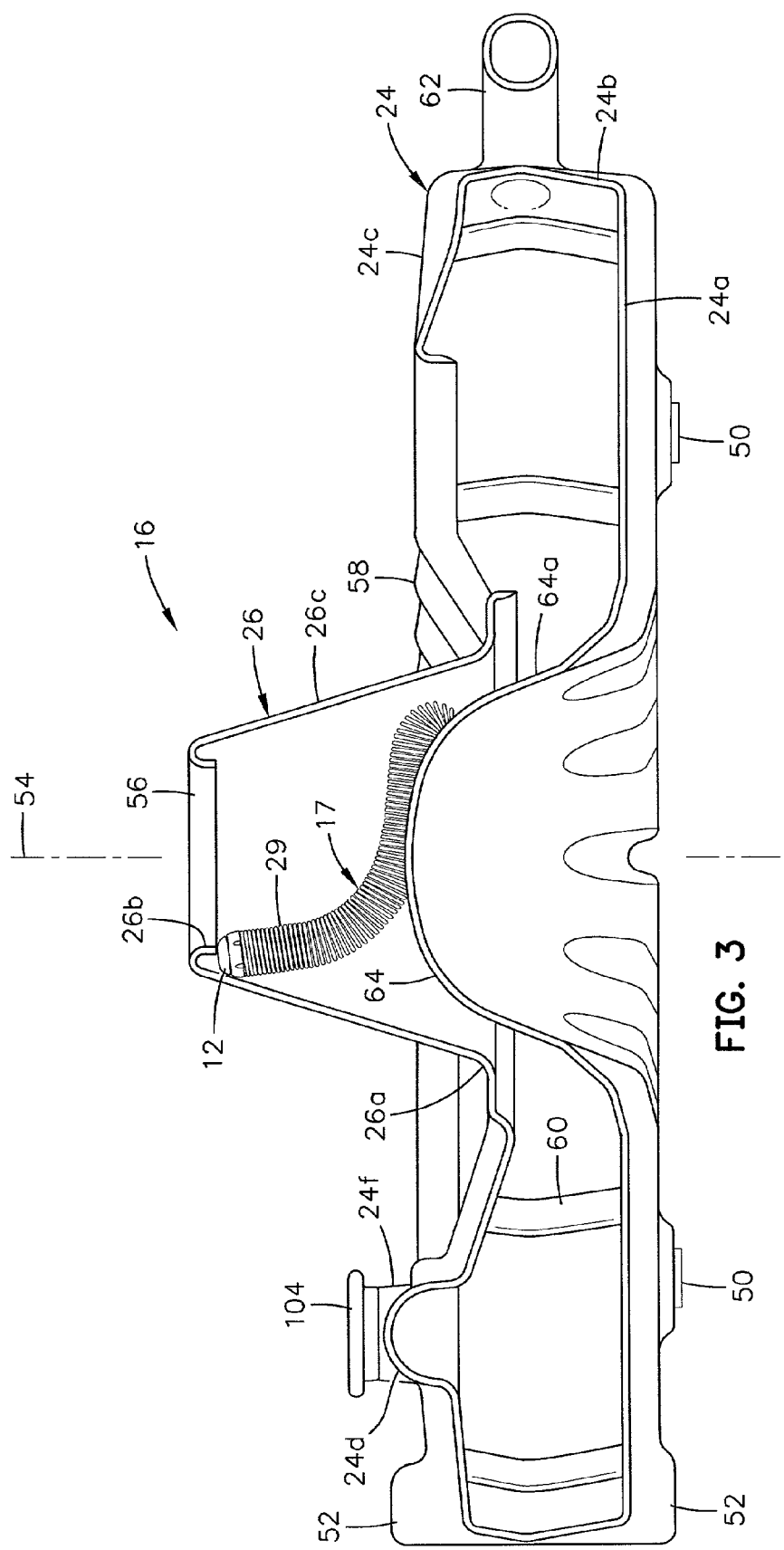
FIG. 3 is an enlarged vertical sectional view of the cable storage drum taken along line 3—3 of FIG. 2. The video camera head and its wet end termination assembly are illustrated in this figure stowed inside the cable storage drum. The dry splice assembly is not shown in section in this drawing figure.
Figure 4:
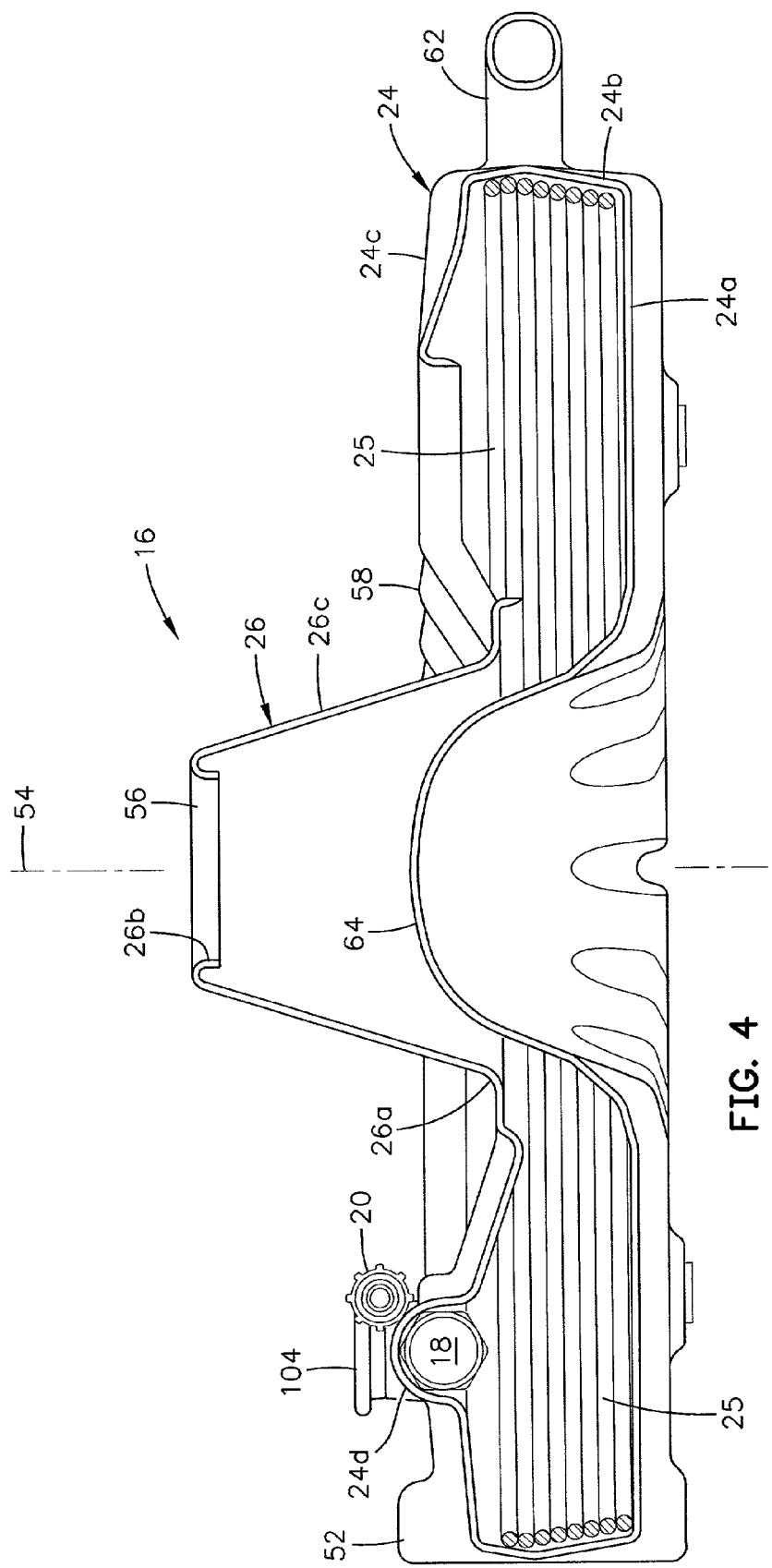
FIG. 4 is an enlarged vertical sectional view of the cable storage drum similar to FIG. 3. The coiled video push cable is illustrated in this figure.

The non-rotating storage cable drum 16 (FIG. 2) has a main hollow annular portion 24 that is configured and dimensioned to stow the video push cable 14 in a stack of coils 25 (FIG. 4). The drum 16 also includes a hollow frusto-conical guide portion 26 centrally located relative to the main annular portion 24. The guide portion 26 is located, dimensioned and configured to facilitate manual paying out of video push cable 14 from the main annular portion 24 and manual re-insertion of the video push cable 14 back into the main annular portion 24, and re-formation of the stack of coils 25 without rotating the drum 16. The central guide portion 26 is also dimensioned and configured for enclosing and retaining the video camera head 12 and its associated wet end termination assembly 17, as illustrated in FIG. 3.

The term "video push cable" as used herein refers not only to the patented video push cables identified above, but to any cable having sufficient flexibility and stiffness to be forced down a substantial length of pipe and capable of carrying signals from a video camera inside a camera head connected to a distal end of the cable. The video push cable may carry electrical signals, or optical signals, or both. It may also have a stiffening member such as a central core made of a composite material, e.g. resin impregnated glass fibers. Thus, the term video push cable as used herein shall also include other cables that have heretofore been employed in commercial video pipe inspection systems as well as various other co-axial cables and fiber-optic cables. A preferred embodiment of our system 10 employs the video push cable of the aforementioned U.S. Pat. No. 5,808,239, the entire disclosure of which is hereby incorporated by reference.

In our video pipe inspection system 10 the wet end termination assembly 17 (FIG. 1) provides a means for connecting the distal end of the video push cable 14 to the video camera head 12. The wet end termination assembly 17 provides the necessary electrical interconnections between the insulated wire conductors within the video push cable 14 and the electronic circuitry within the camera head 12 to permit the video image signals to be transmitted back to the video display and VCR 23. The assembly 17 also provides the necessary electrical interconnection that allows power to be supplied to the video camera head 12 for operating the video circuitry within the camera head 12 as well as the multiple light emitting diodes (LEDs) that illuminate the interior of the pipe being inspected. The wet end termination assembly 17 also provides the mechanical connection between the distal end of the video push cable 14 and the camera head 12. This mechanical connection must be sufficiently strong yet flexible enough to permit the camera head and the attached video push cable 14 to negotiate tight turns and to allow pulling on the video push cable 14 to withdraw the camera head 12 from the pipe, through multiple tight turns.

Figure 6:
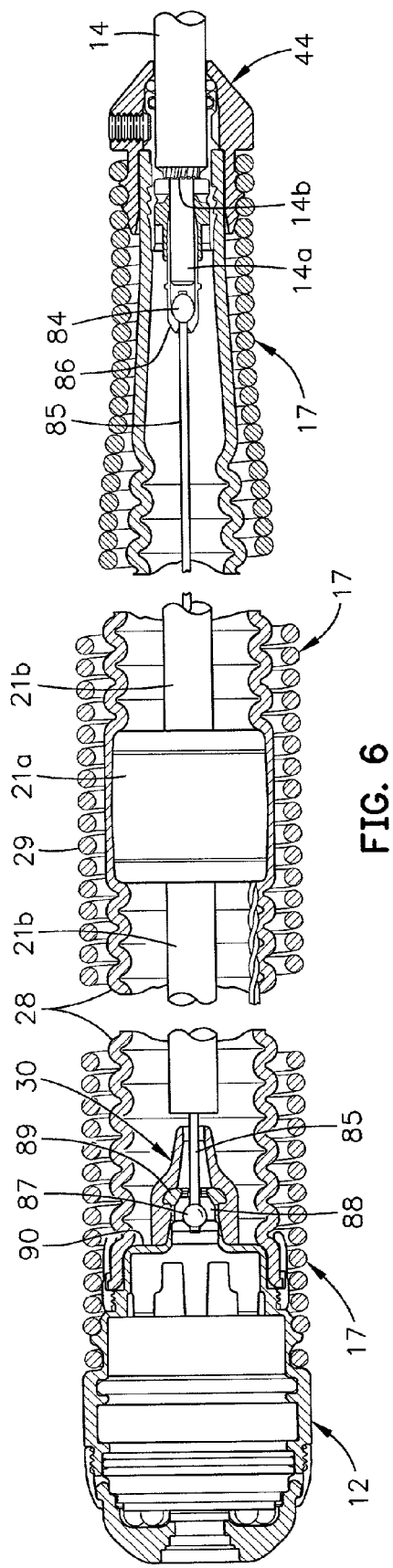
FIG. 6 is a fragmentary longitudinal sectional view through the video camera head and the wet end termination assembly taken along line 6—6 of FIG. 5.

Referring to FIG. 6, the wet end termination assembly 17 includes an elongated ribbed tubular elastomeric boot or bladder 28. The bladder 28 tapers to a smaller diameter moving towards its rearward end. The wet end termination assembly 17 also includes a similarly tapered coil spring 29 that surrounds and protects the elastomeric bladder 28.

An elongated cylindrical transmitter coil 21a (FIG. 6) is positioned within the bladder 28 roughly intermediate its length. The transmitter coil 21a is connected to specific insulated conductive wires 14b from the push cable 14 via leads (not illustrated). The push cable 14 has conductive wires 14b that wrap helically around the central composite or fiberglass core 14a. Four of the fifteen wires 14b extend from the rear end of the wet end termination assembly 17 to the video camera head 12, past the point where the composite core 14a terminates. The forward ends of these four conductive wires 14b are fed to the video camera head 12 via a forward coupling assembly 30 described hereafter. Two of the wires 14*b* are drain wires that do not extend past the rear end of the wet end termination assembly 17. One of the wires 14*b* is a steel strength wire that doesn't extend past the termination of the composite core 14*a*. The wet end termination assembly 17 further includes a rearward coupling assembly 44 described hereafter.

An elongated ferro-magnetic transmitter core 21*b* (FIG. 6) extends through the center of the transmitter coil 21*a*. The core 21*b* is preferably made up of uninsulated flexible oxide coated, steel wire. The core 21*b* fits conformably within the central cavity of the transmitter coil 21*a*. The flexible transmitter core 21*b* can negotiate tight turns in the pipe, and is capable of substantially stronger low frequency emissions than prior art, solid cores which have heretofore been used in connection with video camera heads used in the pipe inspection systems. The longer length of the flexible transmitter core 21*b* increases the effective permeability of the ferrous material making up the core 21*b*.

The transmitter core 21*b* (FIG. 6) is preferably fabricated in the following manner. Uninsulated steel wire measuring 0.005 inches in diameter is wound around a pair of spaced apart spools (not illustrated), and then removed and flattened into a strip. The strip is then helically wound about the electrical wires 14*b* extending from the push cable 14. Several heat shrink bands (not illustrated) are wrapped at longitudinally spaced locations around the helically wrapped uninsulated steel wires. The heat shrink bands are then shrunk upon the application of heat to tightly hold the core 21*b* around the insulated wires 14*b* which are in turn, helically wound about a flexible stainless steel cable 85 described hereafter. The insulated transmitter coil 21*a* can then be slipped over the transmitter core 21*b*, and positioned roughly intermediate its length. The coil 21*a* locks into the bladder 28. The coil 21*a* slides on the core 21*b*. Alternatively, the core 21*b* may be secured to the coil 21*a* by adhesive or other suitable means. The core 21*b* is preferably approximately six inches in length.

A special form of the core 21*b* could be manufactured with conductive wire wound about ferro-magnetic wires as part of a cable fabrication process. The ferro-magnetic wires would be cut to the desired length. This would form a complete core and coil.

It will be understood by those skilled in the art that a flexible transmitter core may be advantageously used when inspecting pipes for defects, leaks or blockages, separate and apart from any utilization of a camera, video push cable and/or cable storage drum. For example, it is possible to construct a transmitter that can be flushed down a pipe or taped onto some other snake device that will emit signals to allow the region of interest to be remotely located with a hand-held locator. Thus, we contemplate a transmitter for use in locating a defect, leak or blockage in a pipe which comprises, in its broadest sense, a flexible ferro-magnetic transmitter core, and a coil surrounding at least a portion of the core. The transmitter core should have a length sufficient to emit signals of significant strength, yet the transmitter core must be flexible enough to make tight turns in moving down a pipe. Our transmitter further includes a coil that surrounds at least a portion of the core. A broad variety of means may be incorporated into the transmitter for supplying the coil with an electrical signal that will cause the core to emit signals that can be remotely detected. We also contemplate that our transmitter would have some form of housing means which could take the form of an encapsulation for providing a water-tight enclosure for at least the coil and the core.

The main annular portion 24 (FIG. 2) and the central guide portion 26 of the cable storage drum 16 are preferably integrally molded of plastic. This may be accomplished by roto-molding polyethylene, polypropylene, polyurethane or other suitable durable plastic material, and blends of the same, which may include ultra-violet inhibitors. The main annular portion 24 of the cable storage drum 16 is configured to provide a drip-proof basin. The drum 16 has no open holes in the underside thereof, so that it will contain any water or other debris that drips or falls off the video push cable 14 as it is withdrawn from the pipe that has been inspected. This prevents the floor, carpet or other surface on which the drum 16 is temporarily located from being soiled.

The main annular portion 24 of the cable storage drum 16 is also provided with a plurality of feet 50 (FIG. 3). Preferably, there are four feet 50 located ninety degrees apart to provide stability. The feet 50 may be separate parts with skid-proof pads which are anchored in holes formed in the bottom wall 24*a* of the main annular portion 24 in a manner that preserves the water-tight nature of the interior of the main annular portion 24. Alternatively, the bottom wall 24*a* could be molded to provide integral feet. The main annular portion 24 is formed with a flared portion 52 (FIG. 2) having a truncated flat outer wall so that the cable storage drum 16 can optionally stand vertically on this flat outer wall. In this position, the central axis 54 (FIG. 3) of the cable storage drum 16 extends horizontally. The flat outer wall of the flared portion 52 may be formed with a drain hole sealed by a removable plug (not illustrated). Chemical disinfectants can also be poured in to the drum 16 to sanitize the cable 14 and can be drained out later on into the appropriate waste receptacle along with any accumulated water or debris.

The central axis 54 extends through the center of the stack of coils 25 as illustrated in FIG. 4. The central axis 54 also extends through the center of the frusto-conical central guide portion 26. A lower end 26*a* of the central guide portion 26 terminates at a location roughly intermediate the height of the main annular portion 24 which is also intermediate the height of the stack of coils 25, although toward the upper end of the stack of coils 25. The outer wall 24*b* of the main annular portion 24 tapers radially outwardly away from the central axis 54 moving upwardly from the bottom wall 24*a*. Thereafter, the upper wall 24*b* begins to taper radially inwardly back toward the central axis 54. The dual taper of the outer wall 24*b* of the main annular portion 24 helps to evenly form the stack of coils 25.

The frusto-conical central guide portion 26 has a round exit aperture 56 (FIGS. 3 and 4) which is bounded or defined by an inwardly rolled over lip 26*b*. The central guide portion 26 is supported by three radially extending spokes 58 (FIG. 2) each having outer ends connected to the main annular portion 24. The spokes 58 descend moving radially inwardly from the top wall 24*c* of the main annular portion 24 toward the central guide portion 26. The spokes 58 are each formed as a plurality of rounded ribs. The regions between the spokes 58 are open and allow visual inspection of the stack of coils 25 as best seen in FIG. 2. The outer wall 24*b* of the main annular portion 24 is formed with a plurality of equally-circumferentially spaced radially extending C-shaped indentations or grooves 60 (FIG. 1) that act as reinforcing ribs. A handle 62 is integrally molded to the main annular portion 24 diametrically opposite the flared portion 52. This allows a user to conveniently lift and carry the cable storage drum 16, the stack of coils 25, and the camera head 12, along with the wet end termination assembly 17 and the dry splice assembly 18, to the location of the pipe to be inspected.

A dome-shaped mandrel 64 (FIGS. 3 and 4) is formed in the center of the bottom wall 24a of the main annular portion 24. The mandrel 64 extends upwardly into the lower portion of the hollow interior of the central guide portion 26. The mandrel 64 is preferably molded as an integral part of the cable storage drum 16, but it could also be formed separately and attached to a continuous bottom wall of the main annular portion 24. The mandrel 64 has a side wall 64a (FIG. 3) which tapers inwardly moving vertically upwardly with respect to the central axis 54. The side wall 64a is spaced apart from, and generally parallel to, the inwardly tapered side wall 26c of the central guide portion 26. This forms an annular gap through which the video push cable 14 can be payed out from the stack of coils 25. The side wall 64a of the mandrel 64 and the tapered side wall 26c of the central guide portion 26 also facilitate re-insertion of the video push cable 14 back into the main annular portion 24 and the re-formation of the the stack of coils 25. The rounded upper surface of the mandrel 64 supports the video camera head 12 and its associated wet end termination assembly 17 in the stowed configuration illustrated in FIG. 3. In this configuration, the inwardly turned lip 26b at the upper end of the central guide portion 26 retains and holds down the camera head 12, against the force of the bent or curled coil spring 29.

The main annular portion 24 and the frusto-conical guide portion 26 are dimensioned and configured to facilitate manual paying out the video push cable 14 and manual re-insertion of the video push cable 14 and re-formation of the stack of coils 25 while the drum 16 rests stationary. In order to accomplish this, the central axis 54 should be the common central axis for both the main annular portion 24 and the central guide portion 26. The paying out and re-insertion of the video push cable 14 is further facilitated by locating the lower end 26a of the central guide portion 26 intermediate the height of the annular portion 24. The round exit aperture formed by the lip 26b at the upper end of the frusto-conical guide portion 26 has an inner diameter selected in accordance with a pre-determined proportional relationship to the outer diameter of the stack of coils 25. As the video push cable 14 exits the main annular portion 24 and the guide portion 26, the video push cable 14 must effectively undergo two right angle (ninety degree) turns. As each three hundred and sixty degree coil of the video push cable 14 is payed out or re-formed, the cable 14 also undergoes torsional twisting, that is to say, rotation about the central longitudinal axis of the cable 14. Paying out of the video push cable 14 and re-insertion thereof back into the cable storage drum 16 can best be accomplished if the round exit aperture 56 of the central guide portion 26 has a diameter that is between about ten percent and about thirty percent of the outer diameter of the stack of coils 25 which is substantially equal to the outer diameter of the main annular portion 24.

Thus, there is a dependency between the diameter of the main annular portion 24 and the diameter of the exit aperture 56 of the central guide portion 26, which is driven by the modulus (stiffness) of the cable 14 which is being uncoiled and re-coiled. In the preferred embodiment of our invention, the video push cable 14 has a central composite rod that adds stiffness to the cable 14 in order to facilitate pushing the video cable 14 down the pipe. If the diameter of the main annular portion 24 is too small, or the diameter of the exit aperture 56 is too large (for a given cable modulus) the cable 14 will not be retained inside the drum 16 and can spontaneously un-spool. The diameter of the exit aperture 56 should be large enough to allow the operator to extract the camera head 12 and wet end termination assembly 17. Since the video push cable 14 experiences torsional twisting from storage in the flat stack of coils 25, minimizing the effects of this twisting more closely replicates the action of a rotating cable reel or drum. Biasing the outer diameter of the main annular portion 24 larger (subject to the constraints explained above) will help minimize the undesirable effects of this twisting.

In addition to solving the un-spooling problem, the design of the cable storage drum 16 includes the central frusto-conical guide portion 26 for re-directing the cable's exit direction along the vertical axis 54 of the drum 16 to provide a user interface similar to a rotating reel or drum. The height of the guide portion 26 depends upon the modulus of the video push cable 14. In general, the height of the guide portion 26 should be substantially equal to the radius of the main annular portion 24. More preferably, the height of the guide portion 26 should be the minimum radius that the push cable 14 is subjected to when re-formed into the stack of coils 25. When a full load of the video push cable 14 is coiled inside the main annular portion 24, approximately one-half of the inside diameter of the stack of coils 25 should equal the height of the central frusto-conical guide portion 26 of the cable storage drum 16. This relationship generally holds true since the cable 14 must make two right-angle turns in order to exit the drum 16. One of these turns is in the plane of the coil 25 in order to reach the center of the main annular portion 24. The other turn brings the cable 14 in substantial alignment with the vertical axis 54. Pushing the design toward compactness, the ratio of the height of the frusto-conical guide portion 26 to the radius of the main annular portion 24 of the drum 16 is optimized in our commercial embodiment at approximately 0.707.

In accordance with our invention, the relationship of the lower end 26a of the central guide portion 26 to the vertical height of the stack of coils 25 should also be optimized. Placing the lower end 26a between the upper and lower boundaries of the stack of coils 25 causes the coils to re-form more evenly inside the drum 16, further reducing the tendency of the cable 14 to spontaneously un-spool. This relationship between the guide portion 26 and the main annular portion 24 also smooths the payout of the cable 14 from the drum 16.

The interior volume of the central guide portion 26 is sufficient to store the video camera head 12 and its trailing wet end termination assembly 17. The guide portion 26 protects the camera head 12 and the wet end termination assembly 17 from impact damage during transit or storage of the system 10. The lip 26b (FIG. 3) at the upper end of the frusto-conical guide portion 26 provides a barrier under which the video camera head 12 can be tucked so as to retain the head 12 within the raised central guide portion 26. The mandrel 64 prevents the camera head 12 and its associated wet end termination assembly 17 from being pushed any further into the drum 16. This arrangement effectively locks the video camera head 12 and spring 29 in a curved, stowed configuration within the drum 16.

The display, VCR or other recording device could be mounted directly to the drum 16. A kick stand could be attached to the drum 16 to stabilize the drum 16 when vertically oriented. The drum 16 could be molded with a receptacle for holding an LCD or other display. The same receptacle, or a different molded receptacle, could hold a battery pack. One suitable display for this purpose is a five inch TFT-LCD display screen.

Figure 7:
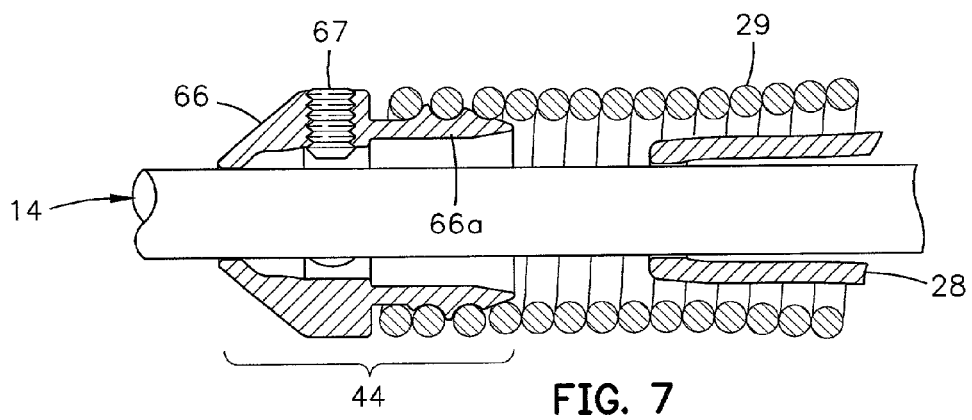
FIG. 7 is an enlarged view of a portion of the wet end termination assembly during the process of building the same.
Figure 8:
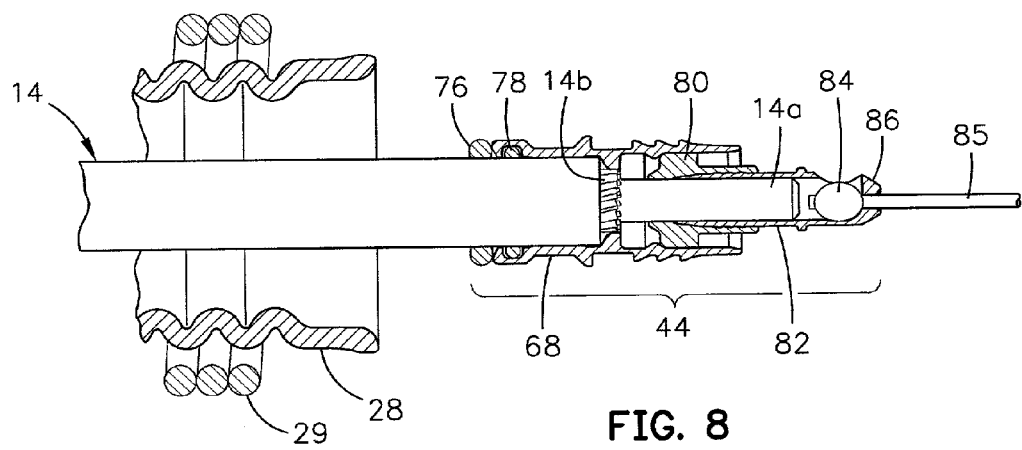
FIG. 8 is an enlarged view of the remaining portion of the wet end termination during the process of building the same.

FIGS. 7 and 8 illustrate the manner in which two separate portions of the wet end termination assembly 17 are built and joined in sequential steps to produce the fully assembled combination illustrated in FIG. 6. The rearward coupling assembly 44 includes a rear cylindrical hollow spring shell 66 (FIG. 7) that is first slid over the distal end of the push cable 14. The exterior of the forward portion 66a of the spring shell 66 is formed with male threads for screwing into the rear end of the spring 29. Three circumferentially spaced set screws 67, only one of which is visible in FIG. 7, are screwed into radially extending female threaded apertures in the spring shell 66 and pressed tightly against the rear portion of a cylindrical capture shell 68 (FIG. 8) to secure the capture shell 68 to the spring shell 66. The rear end of the elastomeric bladder 28 is squeezed between the spring shell 66 and the capture shell 68. Elastomeric O-rings 76 and 78 fit against the rear portion of the capture shell 68 and provide a water-tight seal to the push cable 14.

Figure 5:
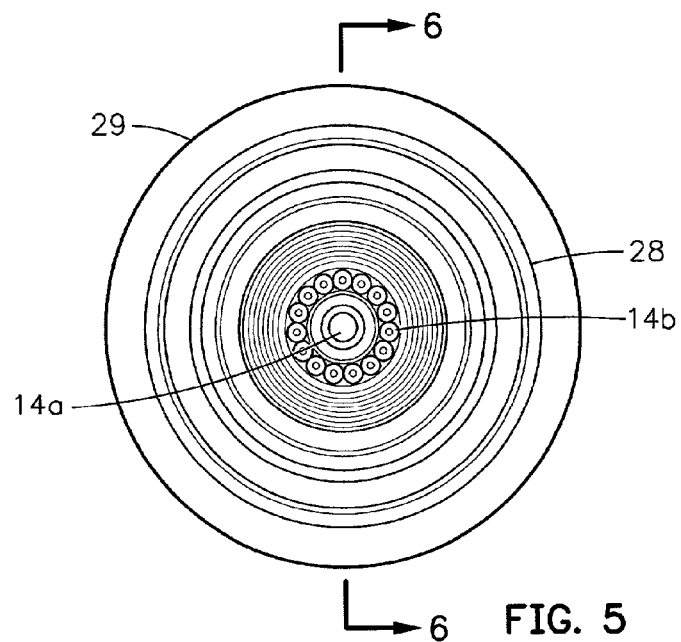
FIG. 5 is a cross-sectional view taken through the wet end termination assembly of the system of FIG. 1.

A cylindrical termination spider 80 (FIG. 8) slides over the composite central rod 14a of the video push cable 14 and is contained inside the forward portion of the capture shell 68. A mounting sleeve 82 is secured by a press fit and/or suitable adhesive such as epoxy to the composite rod 14a and mates with the forward portion of the spider 80. The spider 80 has a plurality of circumferentially spaced, radially outwardly opening recesses (not visible). Each of these recesses receives a corresponding one of the insulated conductive wires 14b (FIG. 5) of the cable 14. These wires extend through the bladder 28 toward the video camera head 12. A metal press ferrule or ball 84 (FIG. 8) is swaged over the rearward end of a flexible stainless steel cable 85. The ball 84 is captured in a side-opening socket member 86 on the forward end of the sleeve 82. As best seen in FIG. 6, the flexible cable 85 extends through the bladder 28 and its forward end is similarly connected to the forward coupling assembly 30 as described hereafter. The flexible cable 85 serves as a strength or tension member to ensure that the video camera head 12 can be pulled out of the pipe without over-extending the coil spring 29, damaging the bladder 28 or breaking any electrical connections. The coil spring 29 ensures that the video push cable 14 will push the camera head 12 through the pipe. The taper of the spring 29 helps provide a better mechanical impedance match with the cable 14. The wires 14b wrap helically around the cable 85 and pass through the center of the helically wound wire core 21b.

The forward coupling assembly 30 (FIG. 6) includes another press ferrule or ball 87 that is swaged to the forward end of the flexible cable 85 and is captured in a spacer 88 seated in a socket member 89 attached to a rear portion of the rugged outer steel housing 90 of the video camera head 12. The forward end of the bladder 28 extends around and is tightly held against the housing 90 to form a water-tight seal. The bladder 28 is filled with a suitable dielectric fluid to protect the components inside the bladder 28. The bladder 28 is prevented from being compressed by the presence of this fluid. In our preferred embodiment, the fluid is Drakeol 35 white mineral oil commercially available in the United States of America from Penreco. The wire conductors 14b from the cable 14 and the wires that selectively connect power to the transmitter coil 21a and video camera head 12 are thus protected from damage.

Figure 9:
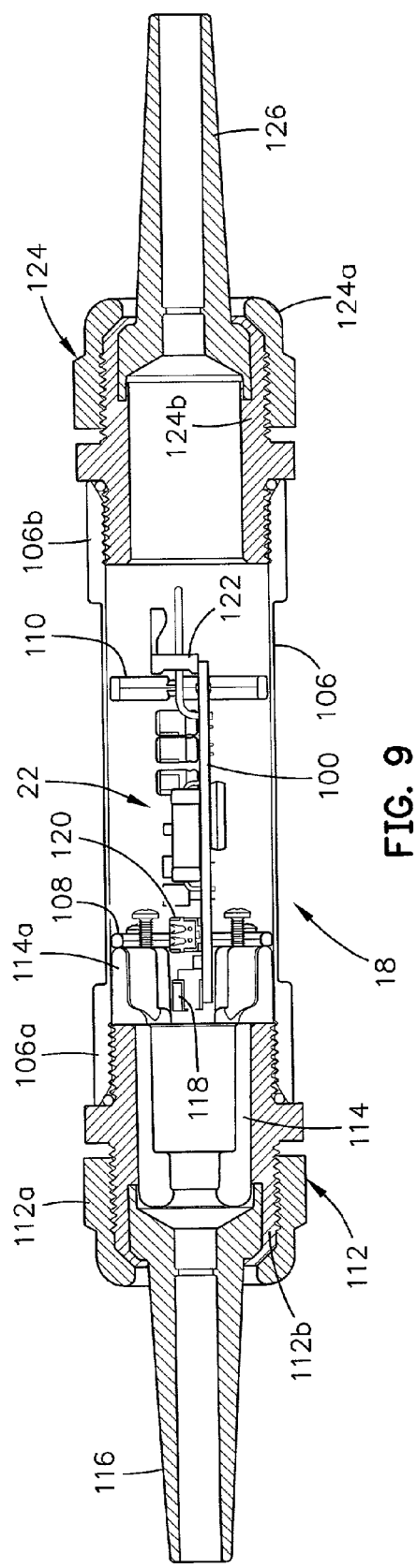
FIG. 9 is an enlarged cross-sectional view of the dry splice assembly of the system of FIG. 1.

The dry splice assembly 18 (FIG. 9) has a generally cylindrical configuration and it is mounted beneath a complementary shaped hump 24d (FIGS. 2–4) formed in the top wall 24c of the main annular portion 24 of the cable storage drum 16. The dry splice assembly 18 electro-mechanically connects the proximal end of the push cable 14. The twelve conductive wires from the video push cable 14 are connected to a printed circuit board 100. The dry splice assembly 18 electrically connects the proximal end of the video push cable 14 to one end of the system interconnect cable 19. The three conductive wires within the interconnect cable 19 are also connected to the circuit board 100. When the system 10 is stored, the interconnect cable 19 is wrapped around posts 24e and 24f (FIG. 2) formed in the top wall 24c of the main annular portion 24 of the cable storage drum 16. The retainer flanges 102 and 104 are secured to the tops of the posts 24e and 24f, respectively, to hold the loops of the interconnect cable 19 to the cable storage drum 16. The interconnect cable 19 exists through one of the retainer flanges 102 or 104 and is also secured underneath the same.

The circuit board 100 of the dry splice assembly 18 has a narrow width to allow it to fit within a water-tight tubular housing 106. The circuit board 100 is engaged in grooves formed in longitudinally spaced ring supports 108 and 110 which locate the circuit board 100 roughly in the center of the tubular housing 106. A water-tight straight-through fitting assembly 112 is threaded into a female threaded segment 106a at one end of the tubular housing 106. The fitting assembly 112 is preferably of the type disclosed in U.S. Pat. No. 5,405,172, the entire disclosure of which is incorporated herein by reference. The fitting assembly 112 is commercially available from Heyco Products, Inc. A cylindrical flared mounting body 114 extends within the fitting assembly 112 and the tubular housing 106. An elongated conical mating adaptor 116 has an inner end contained within the fitting assembly 112 and an outer tapered end which extends along and encloses the proximal end of the video push cable 14. An outer female threaded nut portion 112a of the fitting assembly 112 can be screwed down tight over a male threaded portion 112b of the fitting assembly 112 to press the outer flexible end of the male portion 112b downwardly against the outer circumference of the inner end of the adaptor 116, thus tightly gripping the proximal end of the video push cable 14 and providing a water-tight seal.

The conductive wires 14b from the video push cable 14 are connected through a spider portion 114a of the mounting body 114 to a pin header 118 (FIG. 9) mounted on the circuit board 100. The header 118 may be commercially obtained from AMP under part number 1-173979-2. Two wires (not illustrated) are connected to the co-axial shield layer of the video push cable 14 through a dual header block 120 mounted to the circuit board 100. The circuit board 100 carries the transmitter and camera drive electronics 22.

A friction lock connector 122 (FIG. 9) is also mounted on the circuit board 100 and is used to connect the three conductive wires from the system interconnect cable 19 to the circuit board 100. One suitable part for this purpose is commercially available from AMP under part number 640389-3. Another straight-through fitting assembly 124 is threaded into a female threaded segment 106b at the other end of the tubular housing 106. The system interconnect cable 19 extends through an elongated conical mating adaptor 126. An outer female threaded nut portion 124a of the fitting assembly 124 is screwed down over a male threaded portion 124b of the fitting assembly 124 to provide a water-tight compression lock against the system interconnect cable 19. The durometers of the conical mating adaptors 116 and 126 are preferably matched to the relative stiffness of the video push cable 14 and the system interconnect cable 19 to provide the appropriate strain relief on their mechanical connections. The cable 19 leaving the adaptor 126 exits through a hole (not visible) in the upper wall 24c of the main annular portion 24 and wraps into turns around the posts 24e and 24f.

Thus, our video pipe inspection system 10 offers a lower cost, more reliable alternative to conventional video pipe inspection systems that employ rotating storage cable reels, support stands and electrical slip ring assemblies. The cable storage drum 16 of our system 10 makes it easy and convenient for a plumber or other user to transport the stack of coils 25 of the video push cable 14, the video camera head 12, the wet end termination assembly 17 and the dry splice assembly 18 to the location of the terminus of the pipe to be inspected. The unique configurations of the main annular portion 24 and the central frusto-conical guide portion 26 greatly facilitate manual paying out the video push cable 14 and re-forming the same into the stack of coils 25 with minimal possibility of soiling the adjacent floor. The configuration of the cable storage drum 16 provides the user with a functionality and "feel" similar to that of a rotating drum.

In accordance with yet another aspect of the present invention, we have provided a method for inspecting an interior of a length of pipe. The method includes an initial step of providing a resilient flexible video push cable 14 in a stack of coils 25 wound inside a non-rotating cable drum 16 with a video camera 12 head operatively connected to a distal end of the video push cable 14, and a video display 23 operatively connected to a proximal end of the push cable 14. The next step of the method involves manually paying out the video push cable 14 from the cable drum 16 while the drum is stationary by uncoiling the stack of coils 25 through a central guide portion 26 of the drum 16 and pushing the video camera head 12 down a length of pipe to be visually inspected. The next step involves generating and displaying a video image of the interior of the pipe on the display 23 based on signals from the video camera head 12. The final step involves manually pulling the video camera head 12 out of the pipe, and re-inserting the cable 14 back into the stationary drum 16 through the central guide portion 26 to re-form the stack of coils 25.

While we have described a preferred embodiment of our video pipe inspection system, it should be apparent to those skilled in the art that our invention may be modified in both arrangement and detail. For example, the shape of the main annular portion 24 could be varied from perfectly annular, that is to say, it could be substantially annular, such as oval. Actually, the main annular portion 24 is only substantially annular in that it incorporates the flared portion 52 that has a truncated outer wall that provides a base for standing the drum 16 in a vertical orientation. The main annular portion 24 and the guide portion 26 need not be solid walled structures, but could be a wire basket or other skeletal open framework with a circular guide rim connected thereto via upstanding metal straps. A disc with a diametrically extending slot to permit passage of the video push cable 14 therethrough could be rotatably mounted inside the drum 16 on a track adjacent the lower end 26a of the central guide portion 26. This disc could reduce the cable-to-drum friction otherwise encountered in paying out or re-inserting the cable 14, thus further easing these manual operations. A mechanical or electronic counter could be mounted to the drum 16 to measure the amount of cable 14 payed out to thereby determine the distance location of the camera head 12 within the pipe. Other means for connecting the distal and proximal ends of the video push cable 14 besides the wet end termination assembly 17 and the dry splice assembly 18 could be utilized. Essentially any conventional way of providing an electro-mechanical or opto-mechanical connection between the cable 14 and the camera head 12 on the one end, and between the cable 14 and the system interconnect cable 19 on the other end, could be utilized. Therefore, the protection afforded our invention should only be limited in accordance with the scope of the following claims.

We claim:

1. A video pipe inspection system, comprising:
   a video camera head;
   a resilient, flexible video push cable having a length sufficient for insertion a substantial distance down a pipe;
   means for operatively connecting a distal end of the video push cable to the video camera head; and
   a non-rotating drum stowing the video push cable in a stack of coils, the non-rotating drum including a main hollow substantially annular portion for holding the stack of coils and a hollow guide portion configured to facilitate manual paying out the video push cable from the main annular portion and manual re-insertion of the video push cable into the main annular portion and re-formation of the stack of coils.

2. The system of claim 1 and further comprising means for operatively connecting a proximal end of the video push cable to a system interconnect cable.

3. The system of claim 1 wherein the main substantially annular portion of the drum is made of molded plastic configured to provide a drip-proof basin.

4. The system of claim 1 wherein the guide portion is centrally located relative to the main annular portion and has a generally frusto-conical shape.

5. The system of claim 4 wherein a central axis of the frusto-conical guide portion coincides with a central axis of the stack of coils.

6. The system of claim 4 wherein the drum includes a mandrel located beneath, and spaced apart from, a lower end of the guide portion.

7. The system of claim 1 wherein the central guide portion has a height that is substantially equal to a radius of the main substantially annular portion.

8. The system of claim 1 wherein a lower end of the central guide portion terminates at a location intermediate a height of an outer wall of the main substantially annular portion.

9. The system of claim 1 wherein the central guide portion has a round exit aperture with an inner diameter that is between about ten percent and about thirtypercent of a second outer diameter of the main substantially annular portion.

10. The system of claim 1 wherein the central guide portion is dimensioned and configured for enclosing and retaining the video camera head.

11. A non-rotating drum for stowing a substantial length of a resilient, flexible cable in a stack of coils, comprising:
   a main substantially annular portion for holding a stack of coils of a substantial length of a resilient, flexible cable; and
   a guide portion extending from the main substantially annular portion and configured to facilitate manual paying out the cable from the main annular portion and manual re-insertion of the cable into the main annular portion and re-formation of the stack of coils.

12. The non-rotating drum of claim 11 and further comprising means for connecting a proximal end of the length of cable to a system interconnect cable.

13. The non-rotating drum of claim 11 wherein the main substantially annular portion is made of molded plastic configured to provide a drip-proof basin.

14. The non-rotating drum of claim 1 wherein the guide portion is centrally located relative to the main substantially annular portion and has a generally frusto-conical shape.

15. The non-rotating drum of claim 14 wherein a central axis of the frusto-conical guide portion coincides with a central axis of the main substantially annular portion.

16. The non-rotating drum of claim 11 and further comprising a mandrel positioned below a lower end of the guide portion.

17. The non-rotating drum of claim 11 wherein the central guide portion has a height that is substantially equal to a radius of the substantially annular portion.

18. The non-rotating drum of claim 11 wherein a lower end of the central guide portion terminates at a location intermediate a height of the main substantially annular portion.

19. The non-rotating drum of claim 11 wherein the central guide portion has a round exit aperture with a first diameter that is between about ten percent and about thirty percent of a second outer diameter of the substantially annular portion.

20. The non-rotating drum of claim 11 wherein an outer wall of the main substantially annular portion diverges away from a central axis of the main annular portion moving upwardly from a bottom wall of the substantially annular portion.

21. The non-rotating drum of claim 11 wherein the main substantially annular portion has a truncated flat outer wall so that the drum can stand on a flat support surface with a central axis of the main annular portion extending in a horizontal direction.

22. The non-rotating drum of claim 11 wherein the main substantially annular portion has a plurality of feet so that the drum can rest securely on a flat support surface with a central axis of the main annular portion extending in a vertical direction.

23. The non-rotating drum of claim 11 wherein the central guide portion is supported by a plurality of radially extending spokes each having outer ends connected to the main substantially annular portion.

24. The non-rotating drum of claim 11 wherein the main substantially annular portion and the central guide portion are integrally molded of plastic.

25. A video pipe inspection system, comprising:
a resilient, flexible video push cable having a length sufficient for insertion a substantial distance down a pipe;
a video camera head operatively connected to a distal end of the video push cable; and
a non-rotating drum including a main substantially annular portion for holding the stack of coils and a central frusto-conical guide portion, the main annular portion of the drum and the frusto-conical guide portion being integrally molded of plastic and being dimensioned and configured to facilitate manual paying out the video push cable from the main substantially annular portion and manual re-insertion of the video push cable into the main substantially annular portion and re-formation of the stack of coils by having a central axis of the frusto-conical guide portion substantially coincident with a central axis of the stack of coils, a lower end of the central guide portion terminating at a location intermediate a height of the main substantially annular portion, and a round exit aperture of the frusto-conical guide portion with a first diameter selected in accordance with a predetermined proportional relationship to an outer second diameter of the stack of coils.

26. A video pipe inspection system, comprising:
a resilient, flexible video push cable having a length sufficient for insertion a substantial distance down a pipe;
a video camera head operatively connected to a distal end of the video push cable; and
a cable drum configured for stowing the video push cable in a stack of coils, the drum including a main portion for holding the stack of coils and a central guide portion configured to facilitate manual paying out the video push cable from the main portion and manual re-insertion of the video push cable into the main portion and re-formation of the stack of coils.

27. The system of claim 26 wherein the video camera head is connected to the distal end of the video push cable by a wet end termination assembly.

28. The system of claim 26 wherein a proximal end of the video push cable is connected to a system interconnect cable by a dry splice assembly.

29. The system of claim 26 wherein the main portion has an annular configuration and the central guide portion has a frusto-conical configuration.

30. A method of inspecting an interior of a length of pipe, comprising the steps of:
providing a resilient, flexible video push cable in a stack of coils wound inside a non-rotating cable drum with a video camera head operatively connected to a distal end of the video push cable and a video display operatively connected to a proximal end of the push cable;
manually paying out the video push cable from the cable drum while the drum is stationary by uncoiling the stack of coils through a central guide portion of the drum and pushing the video camera head down a length of pipe to be visually inspected;
generating a video image of the interior of the pipe based on signals from the video camera head; and
manually pulling the video camera head out of the pipe and re-inserting the video push cable back into the stationary cable drum through the guide portion to re-form the stack of coils.

31. A video camera head and wet end termination assembly for use in video pipe inspection system, comprising:
a video camera head;
an elongated bladder having a forward end sealed to the video camera head;
an elongated spring surrounding and enclosing the bladder; and
a rearward coupling assembly connected to a rearward end of the coil spring and sealed to a rearward end of the bladder.

32. The invention of claim 31 wherein the bladder is made of an elastomeric material.

33. The invention of claim 31 and further comprising a quantity of a dielectric fluid filling the bladder.

34. The invention of claim 31 wherein a rearward portion of the bladder and a rearward portion of the spring have a complementary taper that narrows moving in a rearward direction.

35. The invention of claim 31 and further comprising a transmitter mounted inside the bladder including a transmitter coil that surrounds an elongated transmitter core.

36. The invention of claim 35 wherein the transmitter core is sufficiently flexible to bend with the bladder and the coil spring as they are pulled or pushed through the interior of a pipe being inspected.

37. The invention of claim 31 and further comprising a forward coupling assembly connected to the video camera head.

38. The invention of claim 37 wherein the rearward coupling assembly is configured to provide an operative connection with a video push cable.

39. The invention of claim 35 wherein the transmitter core is made of a plurality of individual conductive wires.

40. The invention of claim 37 and further comprising a flexible tensioning cable connected between the rearward coupling assembly and the forward coupling assembly.

41. A video camera head and wet end termination assembly for use in video pipe inspection system, comprising:
   a video camera head;
   an elongated spring having a forward end connected to a rearward end of the video camera head;
   a transmitter mounted inside the spring including a transmitter coil that surrounds an elongated flexible transmitter core; and
   a rearward coupling assembly connected to a rearward end of the coil spring.

42. The invention of claim 41 and further comprising an elongated bladder surrounded by the coil spring and having a forward end sealed to the video camera head and a rearward end sealed to the rearward coupling assembly.

43. The invention of claim 42 wherein the bladder is made of an elastomeric material.

44. The invention of claim 42 and further comprising a quantity of a dielectric fluid filling the bladder.

45. The invention of claim 42 wherein a rearward portion of the bladder and a rearward portion of the spring have a complementary taper that narrows moving in a rearward direction.

46. The invention of claim 41 wherein the transmitter core is sufficiently flexible to bend with the coil spring as it is pulled or pushed through the interior of a pipe being inspected.

47. The invention of claim 41 and further comprising a forward coupling assembly connected to the video camera head.

48. The invention of claim 41 wherein the rearward coupling assembly is configured to provide an operative connection with a video push cable.

49. The invention of claim 41 wherein the transmitter core is made of a plurality of individual ferro-magnetic wires.

50. The invention of claim 47 and further comprising a flexible tensioning cable connected between the rearward coupling assembly and the forward coupling assembly.

51. A transmitter for use in locating a defect, leak or blockage in a pipe, comprising:
   a flexible ferro-magnetic transmitter core;
   a coil surrounding at least a portion of the core;
   means for supplying the coil with an electrical signal that will cause the core to emit signals that can be remotely detected; and
   housing means for providing a water-tight enclosure for at least the coil and the core.

* * * * *